United States Patent [19]

Steyert, Jr.

[11] 4,107,935
[45] Aug. 22, 1978

[54] HIGH TEMPERATURE REFRIGERATOR

[75] Inventor: William A. Steyert, Jr., Los Alamos, N. Mex.

[73] Assignee: The United States of America as represented by the United States Department of Energy, Washington, D.C.

[21] Appl. No.: 776,381

[22] Filed: Mar. 10, 1977

[51] Int. Cl.² ............................................. F25B 21/02
[52] U.S. Cl. ........................................ 62/3; 62/467 R
[58] Field of Search .................................. 62/3, 467

[56] References Cited
U.S. PATENT DOCUMENTS

| 2,510,800 | 6/1950 | Chilowsky | 62/3 |
| 2,589,775 | 3/1952 | Chilowsky | 62/3 |
| 3,108,444 | 10/1963 | Kahn | 62/3 |
| 3,393,526 | 7/1968 | Pearl | 62/3 |
| 3,413,814 | 12/1968 | Van Geuns | 62/3 |
| 3,743,866 | 7/1973 | Pirc | 62/3 |
| 3,841,107 | 10/1974 | Clark | 62/3 |
| 4,033,734 | 7/1977 | Steyert, Jr. | 62/3 |

Primary Examiner—Lloyd L. King
Attorney, Agent, or Firm—Dean E. Carlson; Paul D. Gaetjens

[57] ABSTRACT

A high temperature magnetic refrigerator which uses a Stirling-like cycle in which rotating magnetic working material is heated in zero field and adiabatically magnetized, cooled in high field, then adiabatically demagnetized. During this cycle said working material is in heat exchange with a pumped fluid which absorbs heat from a low temperature heat source and deposits heat in a high temperature reservoir. The magnetic refrigeration cycle operates at an efficiency 70% of Carnot.

18 Claims, 8 Drawing Figures

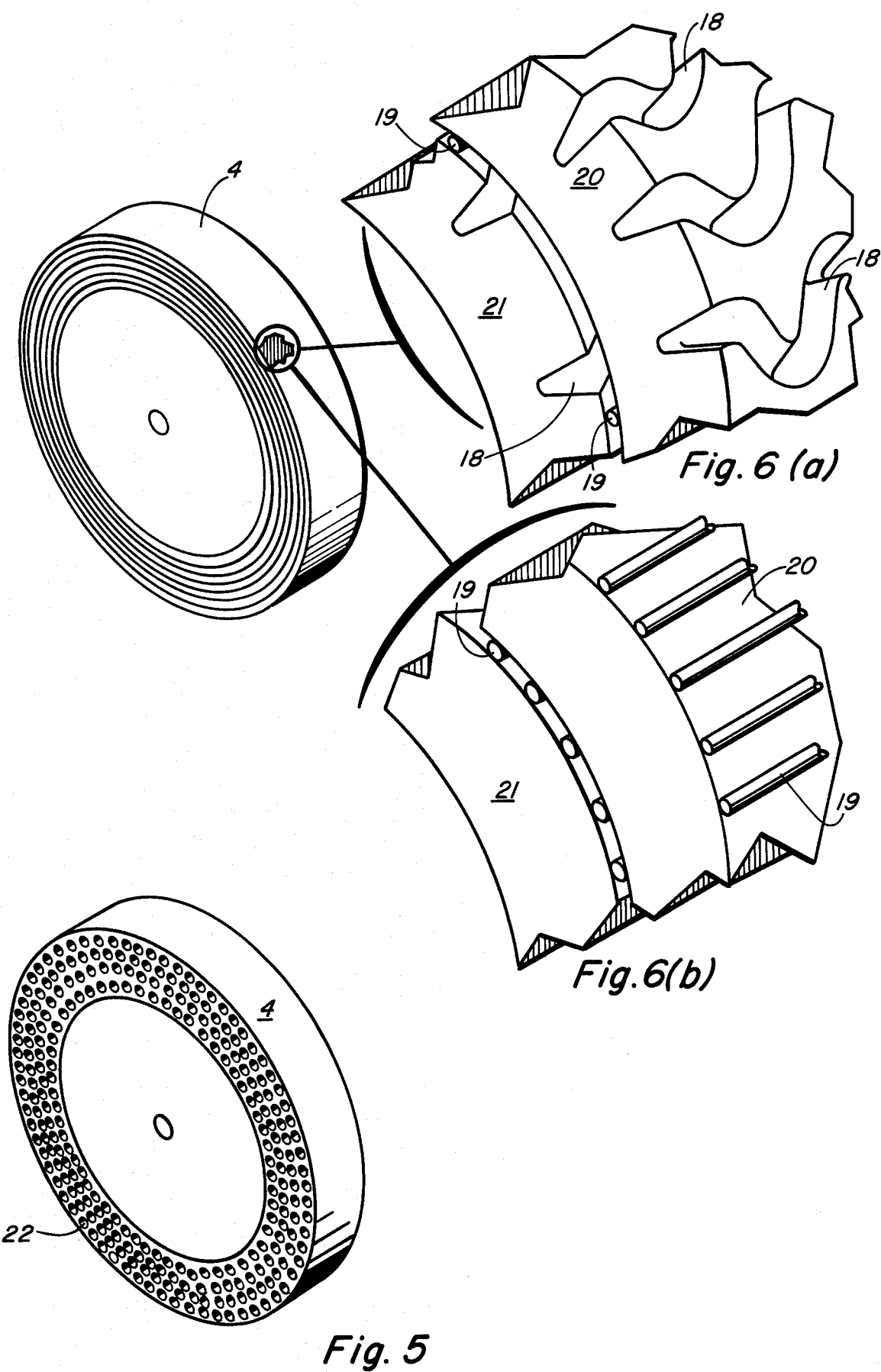

HIGH TEMPERATURE REFRIGERATOR

BACKGROUND OF THE INVENTION

1. Field of the Invention

The utility of this invention is to provide a high capacity, efficient, inexpensive, and compact magnetic refrigerator in the temperature region of 2 K to room temperature (293 K). Magnetic refrigeration involves the expulsion of heat into a high temperature sink from the magnetic working material through the application of a magnetic field. The subsequent removal of the magnetic field cools the working material and allows absorption of heat from a low temperature bath. This process and device operates at high Carnot efficiency, requires no massive gas compressors, and is compact because solids instead of gases are used as the working material.

Using the device and method of this invention, the inventor has found that at high temperatures the lattice and electronic contribution to the working material specific heat is very large. One of the problems solved is that although the working material is able to remove a large quantity of heat from the fluid being refrigerated and to cool that fluid, it is unable to cool very far (not above a 30 K span) because of its own large specific heat. The inventor has solved this problem by forcing a cold fluid to flow in intimate contact through a permeable wheel of magnetic working material and thus cooling the wheel in a high magnetic field. As the working material rotates out of the high field region, it gets even colder. This very cold wheel then is used to cool the fluid to this very low temperature. Now the very cold fluid can absorb heat from a thermal load. In cooling this fluid, however, the wheel has warmed up in preparation for being recooled by the fluid after it enters the high field region. During the cycle heat is expelled by the fluid into the thermal reservoir. The magnetic working materials are operated near their ferromagnetic Curie temperatures; thus, their own internal spinspin coupling enhances the externally applied magnetic field.

2. Prior Art

The principle of magnetic refrigeration is very old and, simply stated, the principle is that the application of magnetic field to a material warms the material and expels heat from the material into a high temperature thermal reservoir. The subsequent removal of the magnetic field causes the material to cool and absorb heat from the substance to be refrigerated. The following is a list and abstracts of the most closely related art known to applicant:

(1). U.S. Pat. No. 2,510,800, C. Chilowsky, is directed to the transformation of thermal energy into mechanical or electrical energy using paramagnetic bodies or ferromagnetic bodies and, using the Curie point of the materials, to effect the change from thermal to electrical energy. In addition, this patent suggests the use of liquid metals. A distinction between the apparatus and method of the patent over the present invention is that the invention of the patent does not expose the stationary working material to a varying magnetic field. In this invention the rotating working material is exposed to both very large and zero magnetic fields during one cycle. The Chilowsky patent method is inefficient since the magnetization of a ferromagnet does not change sharply with temperature in an applied field, even near its Curie point.

(2). U.S. Pat. No. 2,589,775, C. Chilowsky. The method of refrigeration in an apparatus containing ferromagnetic sections having Curie point temperatures approximating the desired temperature of refrigeration located in gaps in a closed ferromagnetic armature, which comprises causing a magnetic flux to traverse the armature, subjecting the ferromagnetic sections alternately to magnetization and demagnetization, passing a fluid in heat-exchange relation with said sections alternately in opposite directions, such passage of fluid being so timed that the phase of magnetization of each section coincides with the passage of fluid in one direction and the phase of demagnetization coincides with passage in the opposite direction, removing heat from the fluid after passing a section in the former direction, and supplying heat to the fluid after passing a section in the latter direction, whereby the space from which heat is supplied is refrigerated. In particular, U.S. Pat. No. 2,589,775 differs in the following respects from the device and method of this invention in that the present invention uses rare earths instead of 3d elements (periodic table) because of their much larger magnetic moment and a superconducting magnet with an intense and high field rather than an iron magnet. The primary distinction is that in this invention the material to be cooled is rotated in and out of the magnetic field, whereas in U.S. Pat. No. 2,589,775 the working material is stationary.

(3). U.S. Pat. No. 3,841,107, Arthur C. Clark. A magnetic refrigeration system includes thermal transfer means comprising a serial arrangement of magnetocaloric elements and a source of magnetic field. The serial arrangement comprises a material having a large, negative magnetocaloric effect which cools upon application of a magnetic field; a paramagnetic material in abutting relationship therewith which cools upon removal of a magnetic field; and end elements functioning as thermal switches. The magnetic field is caused to move along the serial arrangement, permitting heat to be transferred from a heat source to a heat sink. Cascading of the serial arrangements increases the refrigeration effect.

A distinction of the cited patent over the present invention is that U.S. Pat. 3,841,107 uses magnetic switches and therefore is useful only as a very low power refrigerator since metals carry heat poorly compared to the forced flow of the present invention. In addition, the present invention involves rotating the magnetic material, thus providing very rapid cycle rates.

(4). U.S. Pat. No. 3,108,444, D. Kahn. A magnetocaloric cryogenic refrigerator comprising: a pair of spaced, thermally isolated heat reservoirs, a material having superconducting properties thermally connecting said reservoirs with said material being the sole thermal connecting means between said reservoirs, means for subjecting said material to a temperature sufficiently low to cause superconductivity therein, means for subjecting only a portion of said material to a magnetic field of critical field intensity to cause said subjected portion, while thermally isolated, to revert to its normal state with a subsequent decrease in temperature and means for effecting progressive relative movement between said material and said magnetic field to cause a net heat transfer from one reservoir to the other.

The cited patent use superconductors while the apparatus of this invention uses paramagnets and ferromagnets. The Kahn patent separates the field from the fluid by a membrane and thus has poor contact between the working material and the fluid. The present invention forces fluid through permeable magnetic working material.

(5). U.S. Pat. No. 3,393,526, J. Pearl. Heat is pumped from one chamber, which is below the critical temperature of a superconductive material, into another chamber, which is also below the said critical temperature, by placing the ends of a rod or rods of that material in heat transfer relation to the two chambers respectively and by applying a magnetic field, which is strong enough to cause a zone of said rod or rods to become normal, to the end of the rod or rods that is in heat transfer relation with the first chamber. When the zone on the rods becomes normal, it withdraws heat from the first chamber, cooling it. Then the magnetic field, and therefore the normal zone, is moved along the rod to the second chamber, whereby the second chamber absorbs the heat that is trapped in the normal zone and that moves with it. The process may be repeated to still further cool the first chamber. The Pearl patent differs from the high temperature refrigerator of this invention in the following ways: it uses metal into a forced mass transport to carry the heat and uses a superconductor instead of a rotating para- or ferromagnet.

(6). U.S. Pat. No. 3,413,814, J. R. Van Geuns. A method and apparatus for producing cold in which the entropy of a paramagnetic substance is alternately varied by varying an external parameter such as a magnetic field, and a fluid medium such as helium gas is flowed in alternate directions in heat-exchange relationship with the substance. During the directional flows heat and cold, respectively, are dissipated from the substance to the fluid, and corresponding to these flows there is heat-exchange relationship first by a portion of the fluid with an area absorbing heat from the fluid, and subsequently, by a remote portion of the fluid with an area to be cooled. Fluid in the first area is at a generally higher temperature than fluid in the area to be cooled, and portions of fluid in the two areas are not intermixed.

The Van Geuns patent uses nonrotating nonferromagnets while this invention is directed to rotating para- or ferromagnets since cooling is to be done above 20 K which requires the use of ferromagnets. U.S. Pat. No. 3,413,814 teaches that the fluid present at any moment in a cooled area never reaches the area to be cooled. The device of this invention teaches the opposite in that all the fluid in the cooled area will reach the area to be cooled, rotates the magnetic material in and out of the magnetic field, and the fluid is pumped through the material. Thus, rapid cycle rates are allowed in this device.

3. Utility

Enormous utility exists for the device of this invention in that the cost of a high temperature magnetic refrigerator such as described in this application is one-tenth the cost of an equivalent gas refrigerator and operates on one-fifth of the electrical power. Because high pressure compressors and gas-gas heat exchangers are not required, the magnetic refrigerator of this invention has a high degree of mechanical reliability. In addition to its use as a low temperature magnetic refrigerator, the device has further utility in that it can be used as a magnetic engine, i.e., a refrigerator run backwards.

The engine would convert low grade heat, for example, reactor waste heat, geothermal heat, solar heat, and ocean heat, into electricity in a most efficient and economical manner.

SUMMARY OF THE INVENTION

A high temperature magnetic refrigerator having a Carnot efficiency of greater than 70% and working from about 2 K to above room temperature comprising a motor-driven wheel, around which is situate a region of high magnetic field followed by a region of zero magnetic field, said wheel having a rare earth rim, the wheel housing having inlets and outlets positioned on its outer periphery, a working fluid, said fluid being in thermal contact with said rim, external heat load and reservoirs so that heat is absorbed by the fluid from the low-temperature heat load, and is dumped externally by the fluid in the high-temperature thermal reservoir.

BRIEF DESCRIPTION OF THE DRAWINGS

FIG. 5 is a side view of another embodiment of the wheel of FIG. 3.

FIG. 6 is still another embodiment of the wheel of FIG. 3 with exploded views 6a and 6b showing the specific features of the rim of this wheel.

DESCRIPTION OF THE PREFERRED EMBODIMENT

Figure 1:
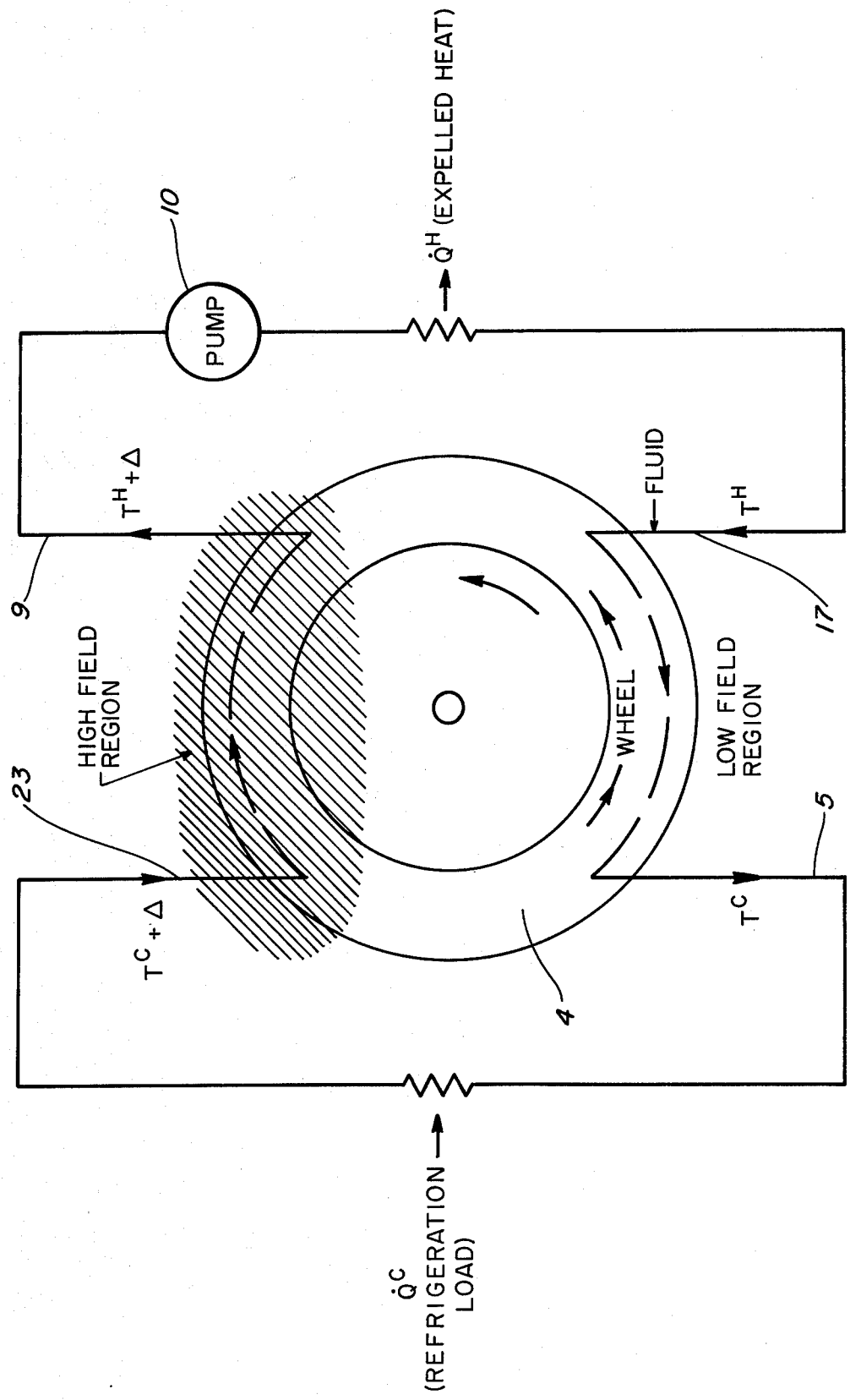
FIG. 1 is a schematic diagram of the process of this invention when it is directed to a refrigeration cycle.

As shown in FIG. 1, fluid pumped at 10, at temperature $T^H$ 17 warms the rim 4 of the wheel in the low field region, leaving it at a cold temperature $T^C$ 5. The fluid absorbs heat $Q^C$, then cools the rim from $T^H + \Delta$ down to $T^C + \Delta$ 23, leaving the rim at $T^H + \Delta$ 9. The said fluid is cooled to $T^H$ giving up heat $\dot{Q}^H$, and reenters the wheel. Delta ($\Delta$) is the temperature increase of the working material when subjected to the magnetic field. Work is done to pump heat from $T^C$ to $T^H$. This comes from the energy required to rotate the wheel, since the side of the rim 4 of the wheel entering the high field region is hot and comparatively nonmagnetic and the region leaving the field is cold and very magnetic.

Figure 2:
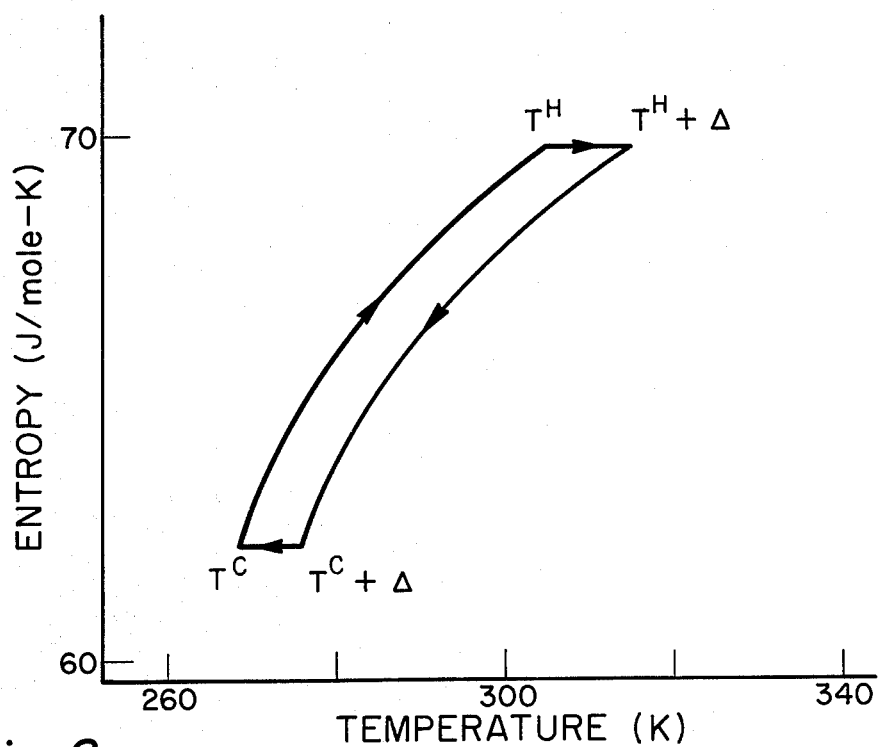
FIG. 2 is a graph showing the relationships between entropy and temperature for the working material consisting of Gd metal chips during a typical refrigeration cycle using the device and method of this invention.

FIG. 2 shows the entropy temperature curves for ferromagnetic gadolinium metal. The gadolinium metal is heated by the fluid in zero field from $T^C$ (268 K) to $T^H$ (308 K). The rim of the wheel is then adiabatically magnetized to $T^H + \Delta$ (316 K) as it enters the high fluid region. It is then cooled by the fluid in the high field (7 T) to $T^C + \Delta$ (276 K), adiabatically demagnetized to $T^C$ (268 K), and is ready to start the cycle over again. The work required to produce this cycle is given by the area of the parallelogram-like graph, roughly 8 J/mole−K × 8 K = 64 J/mole. It may be advantageous to apply a small magnetic field (1 T) to the center of the zero field region of FIG. 1 in order to make the actual Gd entropy curves correspond more nearly with that shown in FIG. 2 between $T^C$ and $T^H$.

Figure 3:
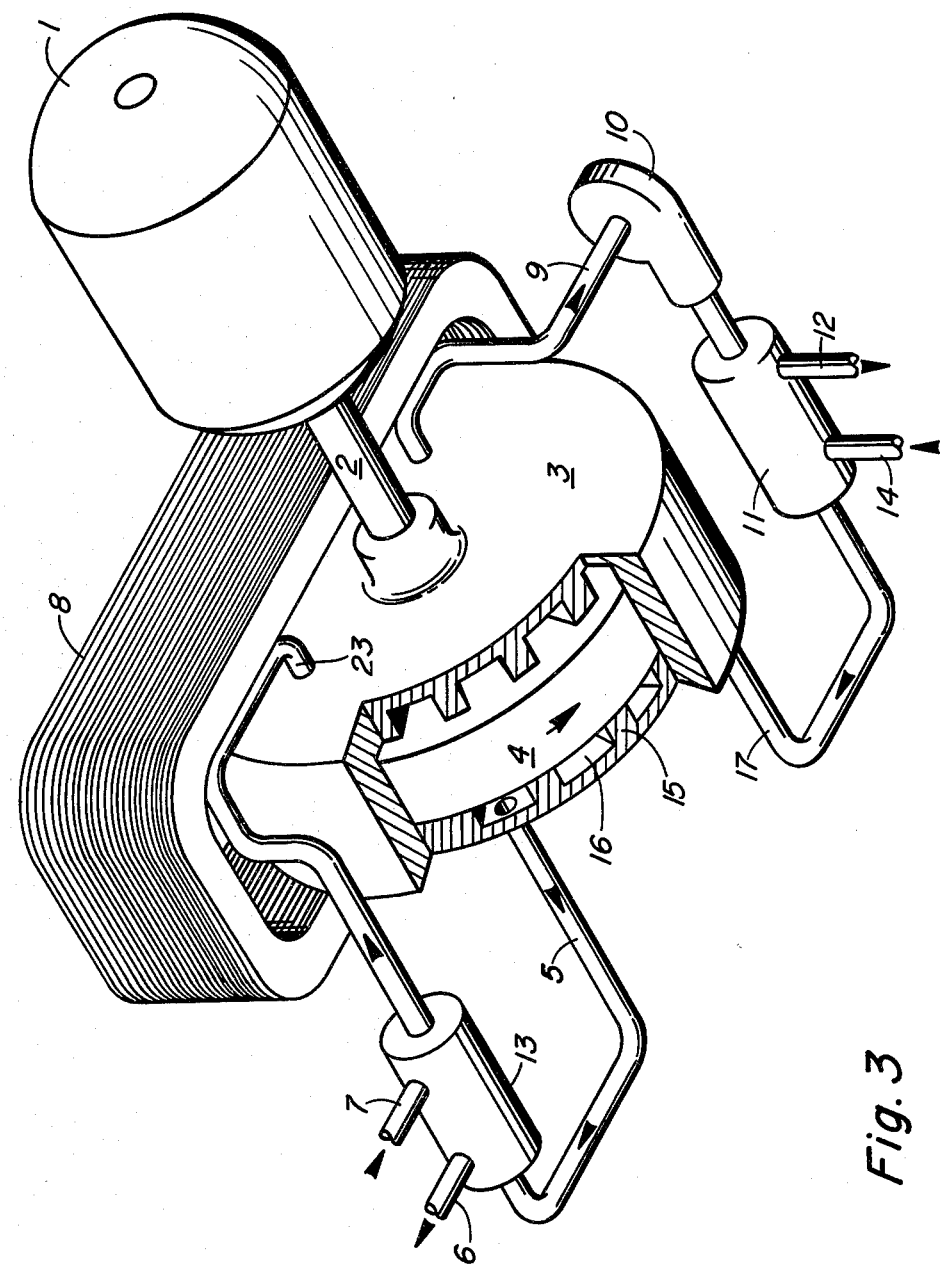
FIG. 3 is a perspective view of the preferred embodiment of this invention with the wheel housing area shown in cross section.

As shown in FIG. 3, a cold fluid having temperature $T^C$ leaving the housing 3 at outlet 5 absorbs heat from the load 13 in this case represented by a counterflow heat exchanger in which fluid from the load enters at 7 and is cooled by the fluid before it exits at 6. The fluid having temperature $T^C + \Delta$ enters housing 3 at 23, absorbs heat in the field of magnet 8 from the rim 4 of the wheel, and leaves through tubing 9 at temperature $T^H + \Delta$. It flows through the circulation pump 10 and deposits its heat in the thermal reservoir fluid of exchanger 11 thus cooling the fluid to a temperature $T^H$. The fluid at temperature $T^H$ enters the housing 3 by means of tubing 17, deposits heat as it flows through the permeable rim 4 of the wheel, reducing the temperature of the fluid to $T^C$ after it makes multiple axial passes through the rim 4 through channel 16, each separated by separator 15, and exits the wheel by means of outlet 5. The wheel is driven by shaft 2 connected to motor 1 and causes the wheel to rotate in a counterclockwise manner. The thermal reservoir fluid enters and leaves the exchanger 11 through inlet 12 and outlet 14. The device as shown in FIG. 3 consists of a 12-in. wheel having a rare earth rim rotating at 0.3 to 3 revolutions per second. The wheel is ½-in. thick with a rim dimension of 2. in. containing the permeable rare earth such as gadolinium metal chips.

Figure 4:
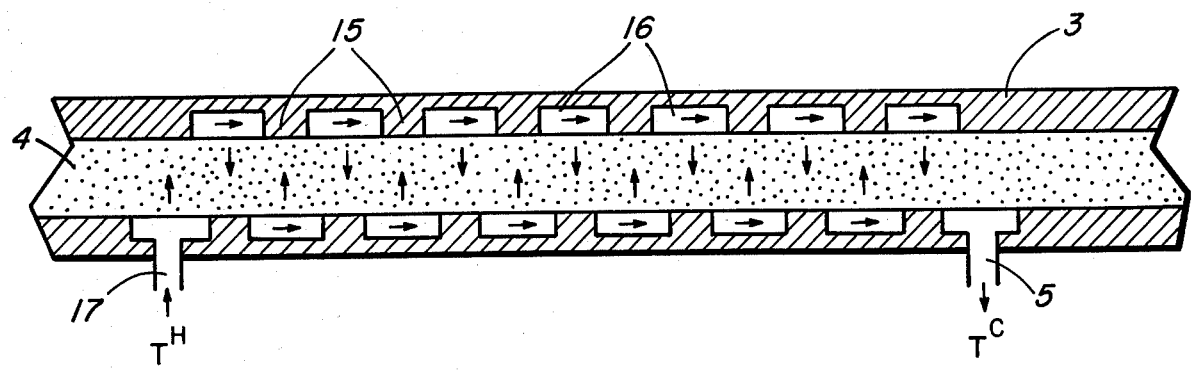
FIG. 4 is a top view in cross section of the housing and the permeable rare earth rim of the wheel of FIG. 3.

As shown in FIG. 4, in order to minimize leakage between the high and low magnetic field regions, the inventor has designed a particular housing with promotes the flow of the fluid in a direction axial to the wheel. The fluid flows back and forth through the rim 4, as the arrows indicate, the fluid entering at inlet 17 as $T^H$ and flows back and forth through the wheel by means of channels 16 in the housing 3 until it reaches outlet 5. The housing 3 is so designed that the tolerances between the housing and the wheel are of the order of a few thousandths of an inch, thus preventing any significant flow along the boundary edge between the rim of the wheel 4 and the separators 15. The flow through the porous rim 4 of the wheel is greater than the leakage flow through the wheel-housing gaps.

FIG. 5 is a side view of another embodiment of the rim 4 in which multiple radial holes 22 have been drilled axially through the said rim. The diameter of these holes is of the order of 0.005 in., and occupies 10 to 40% of the rim volume.

FIG. 6 is another side view of the rim 4 of the wheel with blowups of two alternate designs incorporating grooves across (axially) the rim. In particular, FIG. 6a shows layers of gadolinium metal in the form of a ribbon, said ribbon being about 0.01-in. thick and being spaced by means of wires 19, having a diameter of about 0.001 in., said wires acting as spacers. In addition to the spacers 19, the ribbons 20 and 21 have grooves 18 which are embossed in the ribbon, said grooves having a depth of about 0.005 in. The purpose of the grooves 18 and spacers 19 between the ribbons 20 and 21 is to provide a channel means for the fluid to flow across the spaced gadolinium ribbon. The number of windings of ribbon are of the order of 200-300. The grooves promote the flow of fluid across the ribbon and provide rapid heat contact between the fluid and the working material—gadolinium ribbon. FIG. 6b is similar to FIG. 6a except the flow is accomplished by means of spacers 19 (wires 0.001-in. in diameter) inserted between successive layers of ribbon 20 and 21.

Figure 7:
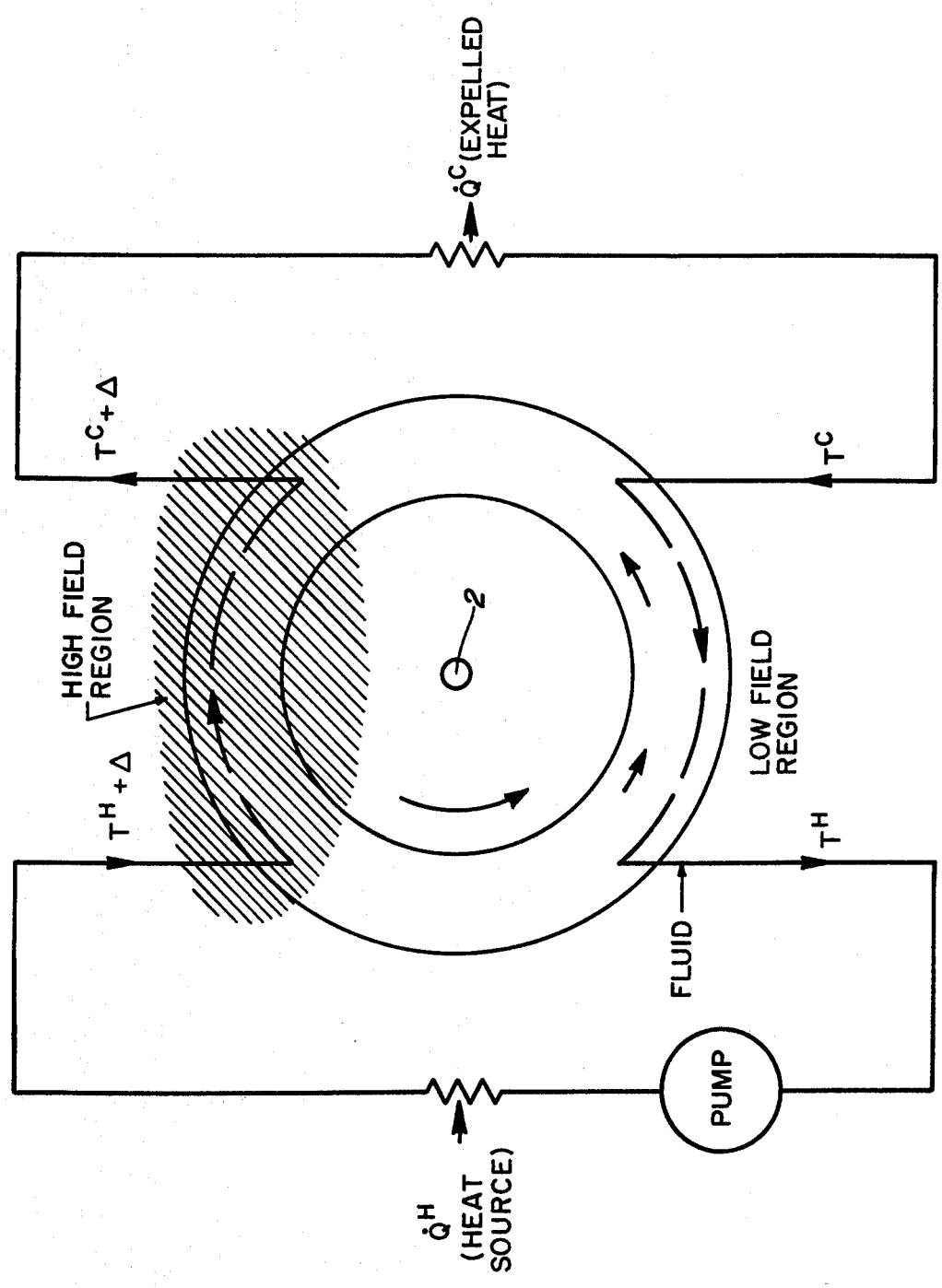
FIG. 7 is a schematic drawing showing the process of this invention being adapted to a heat engine.

FIG. 7 is directed to a schematic flow diagram wherein the device of this invention could be converted to a heat engine. In this application the working material is heated by the hot fluid while it is inside of the magnetic field. Because the working material is hot, the ferromagnet is not very magnetic and little energy is expended in the process of rotating it out of the high field. The cold fluid cools the working material while it is outside the magnetic field at which point the working material is much more magnetic and will deliver rotating power to the shaft 2 as it enters the high field region.

Temperature range of refrigeration load $T^C$ for various fluids is shown in Table 1 and working material is shown in Table 2. These fluids, if in the gaseous form, are pressurized to about 10 atmospheres, or enough to provide high density for good heat transfer. Generally, the highest magnetic field would be utilized, typically 7 T. The greatest fields result in the greatest capacity (most rapid cooling) and greatest temperature span.

Table 1

| Fluid | Range for $T^C$, K |
|---|---|
| Liquid Na-K alloy | 261 → 400 |
| Water-ethanol mixture (pressurized) | 156 → 400 |
| Propane (pressurized) | 90 → 190 |
| $N_2$ (pressurized) | 65 → 120 |
| Ne (pressurized) | 30 → 90 |
| $H_2$ (pressurized) | 25 → 80 |
| He (pressurized) | 2 → 25 |

Table 2

| Working Material | Range for $T^C$, K | Curie Temperature, K |
|---|---|---|
| Gadolinium metal | 255 → 318 | 293 |
| $Gd_{39}Dy_{61}$ | 140 → 255 | 193 |
| $Gd_{12}Dy_{88}$ | 80 → 160 | 120 |
| GdN | 40 → 100 | 65 |
| $Dy_2Er_{0.8}Al_{0.2}$ | 8 → 60 | 25 |

In order to achieve optimum performance of this device, it is necessary that the wheel and fluid capacity flow rates be exactly equal, i.e., $$M_f C_f = M_w C_w$$

where $M_f$ is the mass of fluid per second moving from inlet to outlet and $M_w$ is the mass of working material per second moving from fluid outlet to fluid inlet. The C's are the corresponding specific heats per unit mass.

The criteria for adequate heat transfer is that $M_f C_f T^H/hA\Delta$ be less than about 1. ($hA$ is the product of the heat fluid-wheel heat transfer coefficient and A is the area of that contact. The refrigeration capacity is given by $\dot{Q}^C = M_w C_w \Delta$ when the heat transfer is ideal.

What I claim is:

1. A high temperature magnetic refrigerator capable of a temperature range of refrigeration load from 2 K to 400 K and operating at a Carnot efficiency of greater than 70% comprising in combination:
    (a) motor and shaft means for rotating a wheel, said wheel contained in a housing,
    (b) surrounding a portion of the housing is situate a superconducting magnet with a field strength of about 7 Telsa, and wherein the wheel rotates in and out of this magnetic field,
    (c) said wheel having a rim composed of a permeable rare earth with inlet and outlet means positioned on the said rim's outer periphery, and
    (d) by means of a pump a fluid is circulated within the said housing and is in thermal contact with the rim by passing back and forth by means of multiple separators through the said rim, and then flowing through a refrigeration load and heat exchanger by means of the said inlet and outlet.

2. The apparatus of claim 1 wherein the rare earth rim has a dimension ½-in. width with 2-in. radial depth, and having holes with a diameter of the order of 0.005-in. drilled axially through the said rim such that these holes occupy 10% to 40% of the rim volume.

3. The apparatus of claim 1 in which the said permeable rare earth rim is composed of layers of Gd metal ribbon, said ribbon being about 0.01-in. thick and being spaced from each layer by means of multiple wires inserted axially, said wires creating a spacing of about 0.001-in. between each layer, and said ribbon having grooves axially embossed in the upper surface of the ribbon to a depth of about 0.005-in., and the number of layers of ribbon are of the order of 200 to 300.

4. The apparatus of claim 1 in which at least one of the said fluids is selected from the class consisting of liquid sodium-potassium alloy, pressurized water-ethanol mixture, pressurized propane, pressurized nitrogen, pressurized neon, pressurized hydrogen, and pressurized helium.

5. The apparatus of claim 4 in which the temperature range of refrigeration load ($T^c$) is 261 K to 400 K and the said fluid is liquid sodium-potassium.

6. The apparatus of claim 4 in which the temperature range of refrigeration load ($T^c$) is 156 K to 400 K and the said fluid is a pressurized water-ethanol mixture.

7. The apparatus of claim 4 in which the temperature range of refrigeration load ($T^c$) is 90 K to 190 K and the said fluid is pressurized propane.

8. The apparatus of claim 4 in which the temperature range of refrigeration load ($T^c$) is 65 K to 120 K and the said fluid is pressurized nitrogen.

9. The apparatus of claim 4 in which the temperature range of refrigeration load ($T^c$) is 30 K to 90 K and the fluid is pressurized neon.

10. The apparatus of claim 4 in which the temperature range of refrigeration load ($T^c$) is 20 K to 80 K and the fluid is pressurized hydrogen.

11. The apparatus of claim 4 in which the temperature range of refrigeration load ($T^c$) is 2 K to 25 K and the fluid is pressurized helium.

12. The apparatus of claim 1 in which the rare earth rim is composed of at least one of the following working materials: Gd metal, $Gd_{39}Dy_{61}$, $Gd_{12}Dy_{88}$, GdN, and $Dy_2Er_{0.8}Al_{0.2}$.

13. The apparatus of claim 12 wherein the working material is Gd metal and the temperature range of refrigeration load ($T^c$) is 255 K to 318 K.

14. The apparatus of claim 12 wherein the working material is $Gd_{39}Dy_{61}$ and the temperature range of refrigeration load ($T^c$) is 140 K to 255 K.

15. The apparatus of claim 12 wherein the working material is $Gd_{12}Dy_{88}$ and the temperature range of refrigeration load ($T^c$) is 80 K to 160 K.

16. The apparatus of claim 12 wherein the working material is GdN and the temperature range of refrigeration load ($T^c$) is 40 K to 100 K.

17. The apparatus of claim 12 wherein the working material is $Dy_2Er_{0.8}Al_{0.2}$ and the temperature range of refrigeration load ($T^c$) is 8 K to 60 K.

18. A method of operating the apparatus of claim 1 as a heat engine whereby it accepts heat at the higher temperature, rejecting it at the lower temperature, and performs work through the rotation of a shaft.

* * * * *